US005720472A

United States Patent [19]

Ohgitani

[11] Patent Number: 5,720,472

[45] Date of Patent: Feb. 24, 1998

[54] SHORT-STROKE DOME-SHAPED DISC FILM SPRING

[75] Inventor: Kenji Ohgitani, Tokyo, Japan

[73] Assignee: Polymatech Co., Ltd., Tokyo, Japan

[21] Appl. No.: 689,540

[22] Filed: Aug. 9, 1996

[30] Foreign Application Priority Data

Sep. 21, 1995 [JP] Japan .................................... 7-266202

[51] Int. Cl.$^6$ .................................................. F16F 1/18

[52] U.S. Cl. .......................................... 267/159; 200/83 R

[58] Field of Search .................................... 267/158, 159, 267/161; 200/83 P, 83 B, 83 R, 82 C

[56] References Cited

U.S. PATENT DOCUMENTS 2,860,208 11/1958 Epstein .................................... 267/159

3,873,070 3/1975 Wolf .................................... 267/159

4,667,069 5/1987 Cholkeri .................................... 267/159

*Primary Examiner*—Matthew C. Graham

*Attorney, Agent, or Firm*—McGlew And Tuttle

[57] ABSTRACT

A short-stroke dome-shaped disc film spring comprising a dome-shaped portion and a skirt figure portion, wherein the cross section of the skirt figure portion rises in a line, the rise angel is inclined inward between 40 degrees and 60 degrees, the height of the skirt figure portion is between 0.2 mm and 0.4 mm, and the dome-shaped portion and the skirt figure portion are formed from a resin film of thickness 75 to 200 μm. The dome-shaped film spring has a short stroke at which a feeling of a click is obtained.

2 Claims, 2 Drawing Sheets

SHORT-STROKE DOME-SHAPED DISC FILM SPRING

BACKGROUND OF THE INVENTION

1. Field of the Invention

The present invention relates to the dome-shaped (hemispherical) disc springs, that is, coned springs, used in the switches of a thin and small-sized electric-electronic equipment such as a portable telephone.

2. Description of the Prior Art

A conventional dome-shaped disc spring that is used in a small switch is made of metal such as stainless or copper, or with resin such as polyethylene terephthalate (PET). In the case of the metal spring, the stroke of the dome-shaped portion, at which the buckling of the spring occurs to obtain a feeling of a click, that is, buckled when pressed, and returning to original state when released, can be shortened like about 0.3 mm. However, in a case where a plurality of switches are arrayed in a single equipment, the number of metallic dome-shaped disc springs in correspondence with the number of switches must be assembled, so it is a lot of trobles. Additionally, the surface of the switch cannot be lighted from the back surface of the switch, as shown in FIG. 3, because the metallic spring is opaque, On the other hand, in a case where a dome-shaped disc spring such as shown in FIG. 4 is formed from a resin film, the height of a spring, in case of its diameter being less than 10 mm, is required to be more than 0.65 mm to obtain a feeling of a click. As a result, the stroke of the dome-shaped portion becomes too longer to get a short stroke.

BRIEF SUMMARY OF THE INVENTION

The pitch (interval) between keys (switches) in the input portion of a portable telephone on the market is less than 12 mm, that is, each key arranged neighbored within 12 mm so the diameter of the dome-shaped disc spring to be incorporated in a key is required to be less than 10 mm.

Therefore, in the present invention, a dome-shaped disc spring is made from a resin film those thickness is 75 to 200 μm. The cross section of the skirt figure portion of the spring rises in a line and the rise angle is inclined inward at an angle of 40 to 60 degrees. The height of the skirt figure portion is set to 0.2 to 0.4 mm. In this way, it is possible to make a dome-shaped disc spring of less than diameter 10 mm. In this dome-shaped disc spring, the rigidity in the shearing direction of the dome-shaped portion is obtained from the force from the top of the dome-shaped portion so that the buckling of the spring occurs on the way of the stroke, and consequently, a feeling of a click is obtainable even at a short stroke.

Further objects and advantages of the present invention will become apparent from the following description of the preferred embodiments of the invention as illustrated in the accompanying drawings.

DETAILED DESCRIPTION OF THE PREFERRED EMBODIMENT

Figure 1:
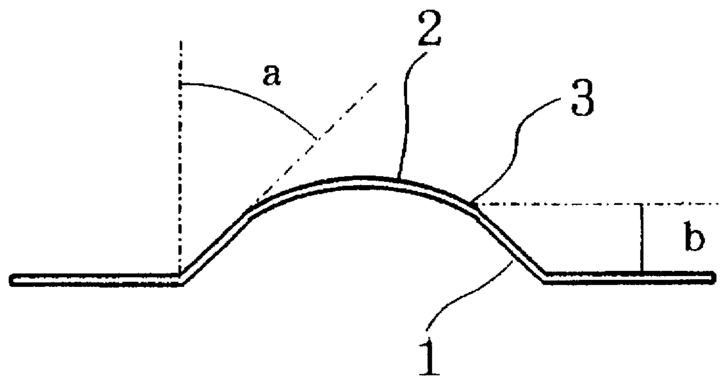
FIG. 1 is a sectional view.
Figure 2:
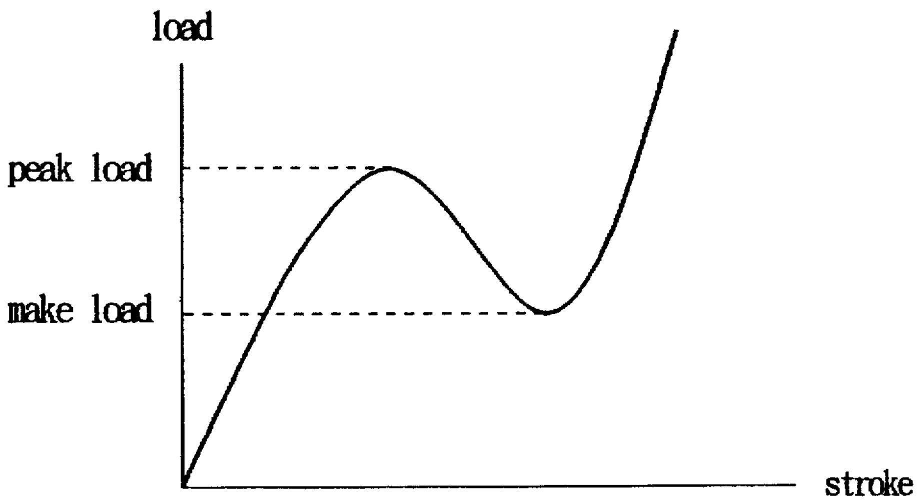
FIG. 2 is a diagram showing the relationship between a load and a stroke.
Figure 3:
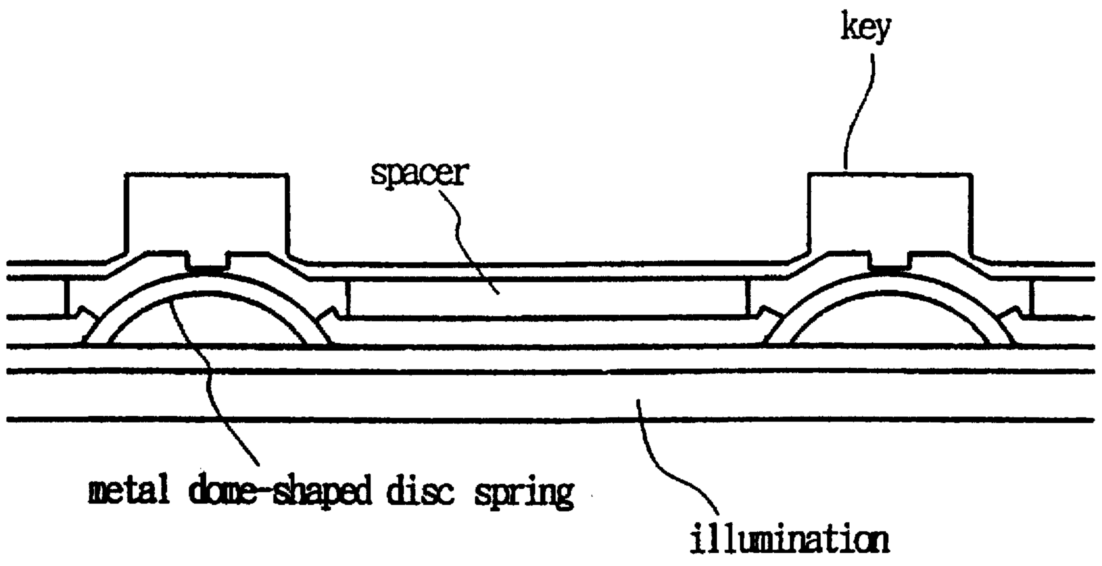
Fig. 3 (PRIOR ART)
FIG. 3 is a structural diagram of a conventional switch.
Figure 4:
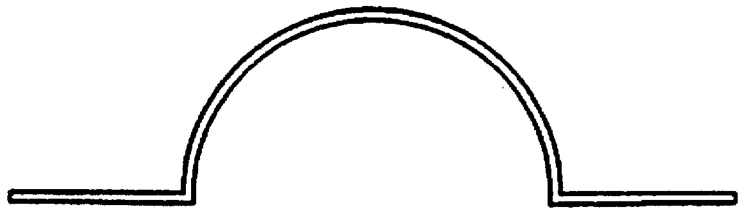
Fig. 4 (PRIOR ART)
FIG. 4 is a sectional view of a conventional dome-shaped resin film disc spring.

A preferred embodiment of a dome-shaped disc film spring according to the present invention will hereinafter be described with reference to the accompanying drawings.

It is preferable that the thickness of a resin film to be used for making the dome-shaped disc spring of the present invention be 75 to 200 μm. If the thickness of the resin film is less than 78 μm, the rigidity of the dome-shaped portion of the spring will not be obtained and therefore a peak load will not be obtained. Conversely, if the thickness exceeds 200 μm, the buckling of the spring will not be obtained. Therefore, in Both cases a feeling of a click is not obtained. It is preferable that the rise angle a of the skirt figure portion 1 of the spring be inclined inward at an angle of 40 to 60 degrees and that the height b be 0.2 to 0.4 mm. If the angle a and the height b are within these numerical ranges, the force from the top of the dome-shaped portion will be concentrated on the skirt figure portion 1. The buckling load is increased, so the occurrence of the buckling of the spring becomes possible at a shorter stroke. If the angle of inclination a is less than 40 degrees, buckling deformation will occur in the boundary 3 between the straight skirt figure portion 1 and the dome-shaped top portion 2. If, on the other hand, the angle of inclination exceeds 60 degrees, the force from the top of the dome-shaped portion will not be concentrated on the skirt figure portion 1 and the whole of the spring will be bent. Thus, if the angle of inclination is outside the aforementioned range, a click (buckling) cannot be obtained. Also, if the height b of the skirt figure portion 1 is less than 0.2 mm, a click cannot be obtained. If the height exceeds 0.4 mm, then the stroke where the buckling of the dome-shaped portion occurs will become longer than 0.4 mm. Therefore, if the skirt figure portion is in a straight shape and inclined like the present invention, then the entire height can be made low like 0.4 to 0.6 mm. Furthermore, a short stroke of less than 0.4 mm and a clicking effect can be obtained.

For the resin film of the dome-shaped disc spring of the present invention, a PET (polyethylene terephthalate) film, a PEN (polyethylene naphthalate) film, and a PPS (polyphenylene sulfide) film can be used.

According to the present invention, in a thin and small dome-shaped disc spring where the diameter is less than 10 mm and the height is 0.4 to 0.6 mm, the stroke can be reduced to less than 0.4 mm and also a better feeling of a click can be obtained. In addition, if the spring can be formed from a transparent resin film, the display portion of a switch where the spring of the present invention is used can be clearly lightened only by the light passing through the back surface of the transparent spring. Furthermore, the use of a resin film makes it possible to mold a plurality of dome-shaped disc springs at the same time, and consequently, the number of assembling labors can be reduced.

Experiment

A plurality of dome-shaped disc springs were molded from a PET film of thickness 100 μm. For the shape of the skirt figure portions 1, the rise angles a, are between 30 degrees and 70 degrees at intervals of 5 degrees and the heights b, are between 0.15 mm and 0.4 mm at intervals of 0.05 mm. The height of the dome-shaped top portion 2 is 0.55 mm and the diameter is 4 mm. For each of the dome-shaped disc springs made in this way, a ratio of (peak load of a given load—make load when the top portion makes contact with the lower surface after buckling, that is, when the switch is input) to the peak load, that is, a click rate, was measured. The click rate is given as follows:

$$\text{Click rate} = \frac{\text{peak load (g)} - \text{make load (g)}}{\text{peak load (g)}}$$

The result of the measurements is shown in Table 1.

TABLE 1

| | angle | | | | | | | | |
|---|---|---|---|---|---|---|---|---|---|
| height (mm) | 30° | 35° | 40° | 45° | 50° | 55° | 60° | 65° | 70° |
| 0.15 | 7 | 7 | 9 | 10 | 12 | 13 | 15 | 8 | 4 |
| 0.2 | 8 | 9 | 21 | 22 | 24 | 26 | 28 | 9 | 4 |
| 0.25 | 12 | 13 | 25 | 27 | 29 | 31 | 33 | 13 | 5 |
| 0.3 | 17 | 19 | 31 | 33 | 36 | 38 | 41 | 19 | 6 |
| 0.35 | 15 | 16 | 31 | 33 | 35 | 38 | 41 | 18 | 5 |
| 0.4 | 13 | 14 | 28 | 30 | 33 | 35 | 38 | 16 | 5 |

(%)

From Table 1 it has been found that, in a case where the rise angle a of the skirt figure portion 1 is between 40 degrees and 60 degrees and the height b of the skirt figure portion 1 is between 0.2 mm and 0.4 mm, a click rate where a click is felt and obtained is more than 20%.

If the height b of the skirt figure portion exceeds 0.4 mm, the stroke will also exceed 0.4 mm. Therefore, in order to obtain a short stroke, it is preferable that the height of the skirt figure portion be less than 0.4 mm.

I claim:

1. A short-stroke dome-shaped disc film spring for a small switch having a diameter of 10 mm or less and a height of 0.4–0.6 mm, said spring comprising a dome-shaped portion and a skirt figure portion, wherein the cross section of said skirt figure portion rises in a line, the rise angle of said skirt figure portion is inclined inward between 40 degrees and 60 degrees, the height of said skirt figure portion is between 0.2 mm and 0.4 mm, and said dome-shaped portion and said skirt figure portion are formed from a resin film of thickness 75 to 200 μm.

2. The short-stroke dome-shaped disc film spring according to claim 1, wherein said resin film comprises either a PET, polyethylene terephthalate, film, a PEN, polyethylene naphthalate, film, or a PPS, polyphenylene sulfide, film.

* * * * *